Patented Apr. 22, 1930

1,755,282

UNITED STATES PATENT OFFICE

HENRY C. WILLIAMS, OF SARGENT, NEBRASKA

FUEL COMPOSITION

No Drawing.  Application filed October 20, 1927. Serial No. 227,612.

My present invention relates to fuel compositions and it is in the nature of an improvement on the fuel compositions which I have set forth and fully described in my copending application, now Patent Number 1,648,434, filed March 8, 1927, with the further object of providing a fuel composition which is somewhat lower in cost of manufacture and of such nature that it provides a flame of more intense heat. It is also my object to add a coloring matter which will give the mixture a more attractive appearance and at the same time disguise the composition, to add a petroleum derivative and to add another liquid fuel which masks the odor of the petroleum and acts as a carrier for the coloring matter.

In carrying out my invention I use as a base a mixture of paper pulp or wood pulp and sawdust in the approximate proportions of 30% of paper pulp to 70% of sawdust, and to this mixture I add a small amount of potassium nitrate. As a separate mixture I add denatured or wood alcohol to fuel oil or distillate or the like, and for altering the color I add aniline dye to the mixture of fuel oil and alcohol. I then combine the mixture of paper pulp, sawdust and potassium nitrate with the liquid mixture which I have described.

The paper pulp and sawdust are both very absorbent and they take up a considerable quantity of the liquid mixture. While the two mixtures could be combined by pouring the liquid over the mixture of solids, I have found it desirable to put the mixture of the solids in a container having the requisite quantity of the liquid mixture and then tamping the mass in the container so as to drive out the air and to compact the mixture. The tamp not only compresses the mixture of solids but it facilitates the capillary action in the pulp and sawdust so that the liquid mixture is more readily absorbed, the resulting mass having a considerably reduced volume.

The paper pulp which I use in my mixture may be produced in any desired manner. It is available in the form of old newspapers or a satisfactory pulp having little or no value as a paper making pulp may be produced from cornstalks or weeds or any other waste plant product. It is light in weight and very absorbent. It ignites easily and burns with a steady and somewhat intense heat. In the making of the paper pulp by the chemical process, the resin and lignin are removed, both of which would be somewhat objectionable in a fire starting composition in the proportions usually found in vegetable matter. While the sawdust contains resin and lignin in varying proportions, the proportion is materially reduced by the addition of the paper pulp. The paper pulp is, of course, reduced by shredding or otherwise to a rather finely divided state so that it can readily be mixed with the sawdust.

The potassium nitrate materially increases the combustibility of the paper pulp and sawdust by supplying oxygen and it causes the carbon to burn more perfectly and thus serve as a soot eliminator and preventative. Both the fuel oil and the alcohol are also combustible and they are vital both for keeping the mass in a moist and compact condition and for supplying considerable heat when the composition is ignited. The fuel oil alone has a strong odor and the alcohol has the double function of serving as an additional source of heat and as a deodorant so that the mixture will have little or no odor. The aniline dye serves merely as a coloring matter to disguise the appearance of the ingredients of the mixture and to give a pleasing appearance to the mixture. It is obvious that the aniline dye could not be satisfactorily added to the mixture of the dry ingredients except in solution. The alcohol is an excellent solvent for the aniline dye and it thus serves as a carrier for the dye in addition to the functions already enumerated.

The fuel mixture may be used for starting fires in the manner described in my copending application. For the furnace or grate a small amount of the mixture is placed on a sheet of paper resting on the grate and the coal or wood is placed above this. A relatively small amount of the mixture such as a small handful is sufficient to start a coal fire. The mixture is also useful as a fuel when only a relatively small amount of heat is desired as in the spring and autumn or when it is desired to use the kitchen range for only one or two dishes. Its chief use as a fuel is in camping since it permits the camper to carry a small amount of fuel occupying very little space and which is capable of producing a great amount of heat. Innumerable other uses may be found for it. For example, the present practice of heating wagon tires is to rotate them in the forge until all parts have been heated to provide sufficient expansion for the tire to be placed on the rim of the wheel. With the composition which I have just described it is possible to place the tire on the ground and to scatter the mixture in a thin layer about the tire. By igniting this mixture the tire is then uniformly heated so that an equal expansion results in the tire.

Having thus described my invention in such full, clear, and exact terms that its composition and utility will be readily understood by others skilled in the art to which it pertains, what I claim as new and desire to secure by Letters Patent of the United States is:

A fuel mixture including cellulose pulp in finely divided form mixed with sawdust in substantially the ratio of three parts of cellulose pulp to seven parts of sawdust, the mixture including also a relatively small amount of potassium nitrate, the mixture of cellulose pulp, sawdust and potassium nitrate being moistened with a mixture of a liquid petroleum derivative, an alcohol and an alcohol soluble coloring matter, the alcohol serving as a source of heat, as a deodorant for the petroleum derivative and as a carrier for the coloring matter.

In testimony whereof I affix my signature.

HENRY C. WILLIAMS.